United States Patent [19]
Adolphi

[11] 3,712,208
[45] Jan. 23, 1973

[54] APPARATUS AND PROCESS FOR PREPARING COOKED EGG PRODUCTS

[76] Inventor: George F. Adolphi, 7221 Amherst St., La Mesa, Calif. 92041

[22] Filed: Aug. 28, 1970

[21] Appl. No.: 67,750

[52] U.S. Cl. ..........................99/373, 99/427, 99/440
[51] Int. Cl. ...............................................A47j 43/20
[58] Field of Search........99/373, 372, 374, 377, 380; 107/1, 8, 19

[56] References Cited

UNITED STATES PATENTS

| | | | |
|---|---|---|---|
| 2,245,387 | 6/1941 | Christie | 99/372 X |
| 2,922,356 | 1/1960 | Oliver | 99/373 |
| 3,064,555 | 11/1962 | Nanna | 99/373 X |
| 3,271,813 | 9/1966 | Gernandt et al. | 107/19 R X |
| 3,391,656 | 7/1968 | Schafer | 107/1 A |
| 3,408,964 | 11/1968 | Marie | 99/373 X |

Primary Examiner—Billy J. Wilhite
Assistant Examiner—Arthur O. Henderson
Attorney—Carl R. Brown

[57] ABSTRACT

Apparatus in which bulk egg white is cooked in shaped molds under a layer of oil that is pressurized by gas to produce egg units in the simulated form of hard boiled egg halves, ready for filling with compatible food products. The process is carried out at a high rate of production in a machine having multiple arms carrying the molds on a rotating assembly, which is indexed to successive handling stations at which the steps of preparing and filling the molds, cooking, and ejecting the cooked product, occur automatically in sequence. Cooking is closely timed and performed in a safe manner by continuously circulating heated oil through the molds, which are maintained at a constant controlled temperature.

16 Claims, 14 Drawing Figures

OPERATING SEQUENCE

| STATION | FUNCTION |
|---|---|
| 1 | RETRACT LOWER MOLD. |
| 2 | IDLE. |
| 3 | SPRAY COATING OF OIL ON LOWER MOLD. |
| 4 | INJECT EGG WHITE INTO LOWER MOLD. |
| 5 | APPLY LAYER OF OIL OVER EGG WHITE. |
| 6 | CLOSE UPPER MOLD. |
| 7 | PRESSURIZE MOLD CAVITY. |
| 8 TO 33 | CONTINUOUS COOKING. |
| 34 | RELEASE PRESSURE FROM MOLD CAVITY. |
| 35 | OPEN UPPER MOLD. |
| 36 | RAISE LOWER MOLD TO EJECT COOKED PRODUCT. |

Fig. 14

INVENTOR.
GEORGE F. ADOLPHI

BY

*Carl R. Brown*

ATTORNEY

APPARATUS AND PROCESS FOR PREPARING COOKED EGG PRODUCTS

BACKGROUND OF THE INVENTION

In the preparation of devilled eggs and similar filled egg products, the eggs are usually hard boiled, then shelled and cut in half, so that the yolks can be removed. The process involves considerable manual labor, which makes the product expensive. Since this well known process is not practically adaptable to automation, cost reduction must be achieved by a new approach to the problem.

SUMMARY OF THE INVENTION

The apparatus described herein utilizes a novel process to produce egg units in the simulated form of hard boiled egg halves, directly from bulk raw egg white. This process eliminates the shelling, cutting and yolk removal operations. Egg units are formed in multiple cavity shaped molds, which are internally heated in a safe manner by continuously circulated hot oil to cook the products evenly. For rapid production the molds are carried on multiple arms of a rotating assembly, which is indexed to sequential handling stations. At successive stations each mold is opened, the shaped cavities are coated with oil to prevent sticking, egg white is injected into the cavities, then the mold is closed and pressurized for a considerable portion of a rotational cycle of the machine, ensuring a closely timed cooking operation for consistent results. At the end of the cooking period, the mold is opened and the cooked products ejected. All steps of the process are carried out automatically by simple mechanisms timed to the indexing of the machine, the attention of an operator being required only to maintain the supply of oil and egg white.

The egg white in the mold is covered with a layer of cooking oil and a gas under pressure is applied to the cooking oil layer. This gas pressure tends to stratify the egg white, oil and gas causing the egg white to fill out the voids in the mold and to have relatively square upper edges in the cooked form.

The primary object of this invention, therefore, is to provide a new and improved apparatus and process for preparing cooked egg products.

It is another object of this invention to provide a new and improved apparatus which will produce cooked egg products at a high rate of production by a fully automatic process.

Another object of this invention is to provide a new and improved apparatus in which egg products are formed and cooked in heated molds, which are indexed to successive handling stations in a continuous operation.

A further object of this invention is to provide a new and improved apparatus which is self-contained and requires only the replenishment of raw materials during prolonged operation.

Another object of this invention is to provide a new and improved apparatus and process for preparing cooked egg white from bulk egg white in the form of cooked egg white halves.

Other objects and many advantages of this invention will become more apparent upon a reading of the following detailed description and an examination of the drawings, wherein like reference numerals designate like parts throughout.

DESCRIPTION OF THE PREFERRED EMBODIMENT

The apparatus comprises a rotatable assembly 10, having a cylindrical hub 12 with a plurality of radially extending arms 14 fixed on the hub. At the outer end of each arm is a mold assembly 16, the mold assemblies being secured together to form the periphery of the wheel-like rigid rotatable structure. Hub 12 is mounted on and driven by an indexing drive unit 18, powered by a suitable motor 20, and rotates about a vertical axis. A stationary center post 22 extends upwardly through the axis of hub 12 and supports a fixed platform 24 above the hub. The indexing drive unit is a conventional mechanism, as made by Ferguson Machine Company and others. Such drive mechanisms are available with a stationary center post and can be set up to stop or index at any desired number of stations in a cycle of rotation, with any specific dwell time at each station. As shown, the rotatable assembly has thirty six arms and an equal number of indexed positions. Other numbers may be used, as long as the timing and cycle duration are sufficient to ensure complete cooking. The arms and mold assemblies are all identical and each contains all necessary actuating mechanism for mold operation.

Arm 14 has a vertical inner end flange 26 for attachment to hub 12 and an outer end flange 28, to which the mold assembly is secured. The mold assembly 16 has a frame 30, fixed at its inner end to flange 28, the outer side portions 32 of the frame being inclined to interfit with adjacent frames. The side portions 32 of the frames are fastened together by any suitable means to secure the outer periphery of the rotatable assembly in rigid alignment. On the outer end of frame 30 are upwardly projecting hinge brackets 34, the lower mold 36 having a hinge portion 38 which is pivotally held between the brackets. The lower mold 36 is normally in a horizontal position above the frame 30 and, in this position, the inner end of the mold rests on adjustable stops 40 projecting upwardly from the frame. In the upper surface of lower mold 36 are cavities 42 each shaped in the form of a half egg. Twelve cavities are shown to mold a dozen egg units at a time, but any other suitable arrangement may be used. The lower mold is hinged to swing upwardly and outwardly beyond the vertical to eject the molded products and is operated by an actuator 44, shown as a double acting pneumatic jack. The actuator 44 is pivotally attached at one end to a lug 46 on frame 30, the piston rod 48 of the actuator being connected to a fork 50 on the underside of the mold.

Figures 1, 2:
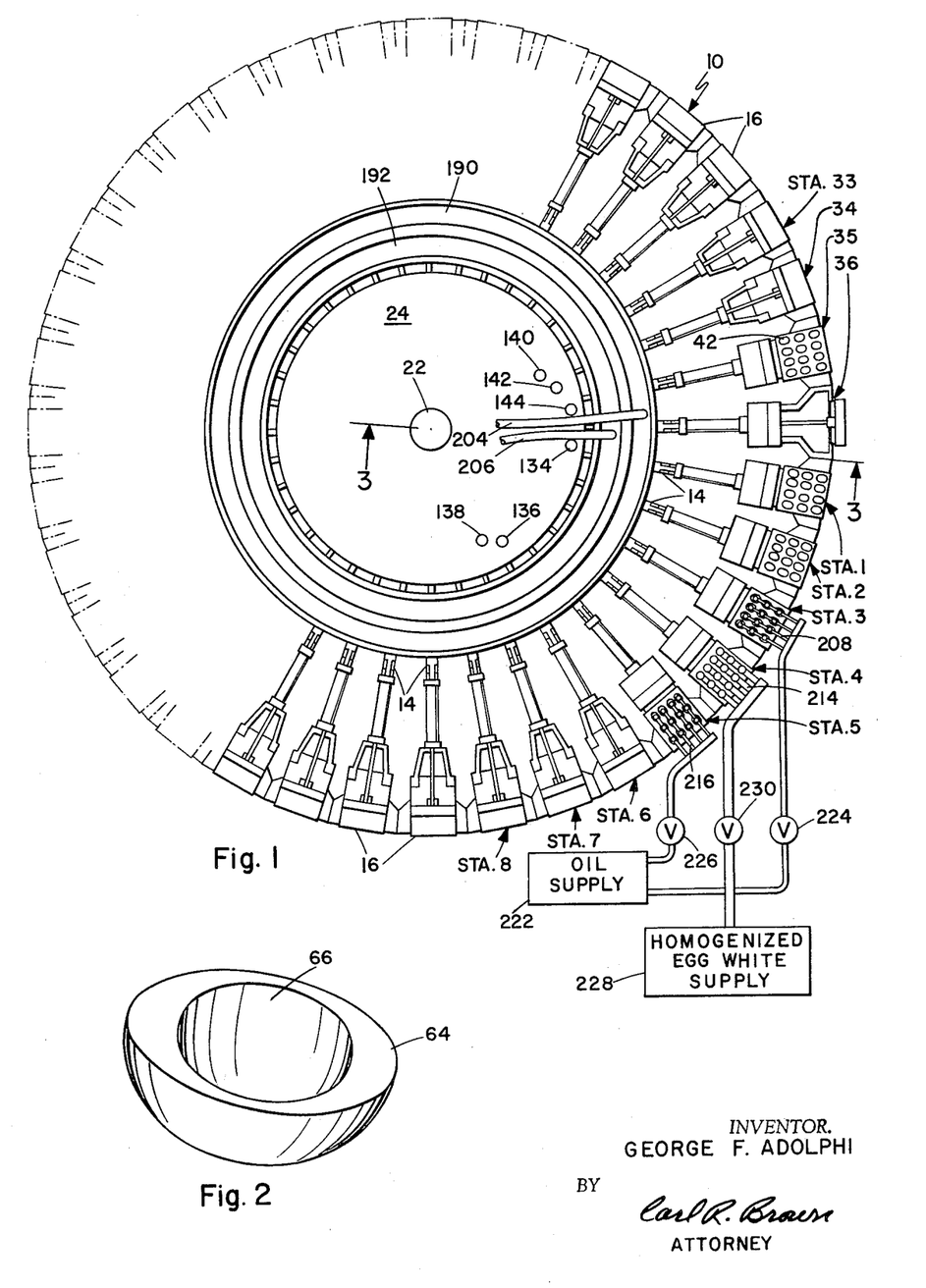
FIG. 1 is a top plan view of the complete machine, portions being shown diagrammatically.
FIG. 2 is a perspective view of a typical egg product unit.
Figure 6:
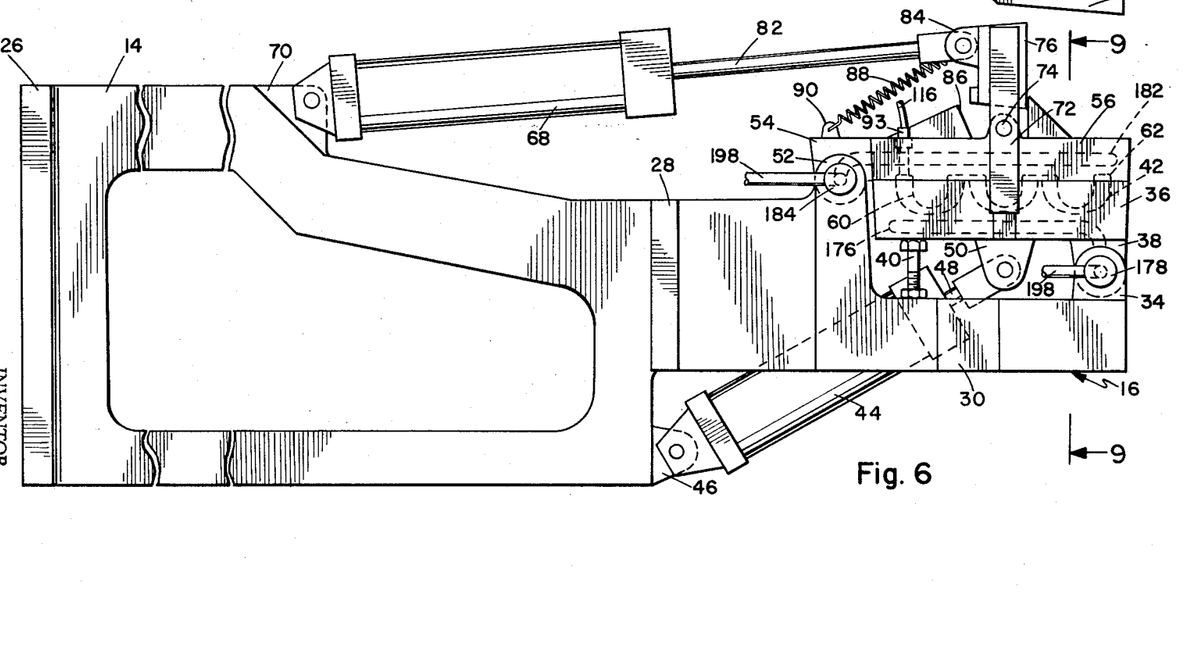
FIG. 6 is a side elevation view of the structure of FIG. 5.
Figure 7:
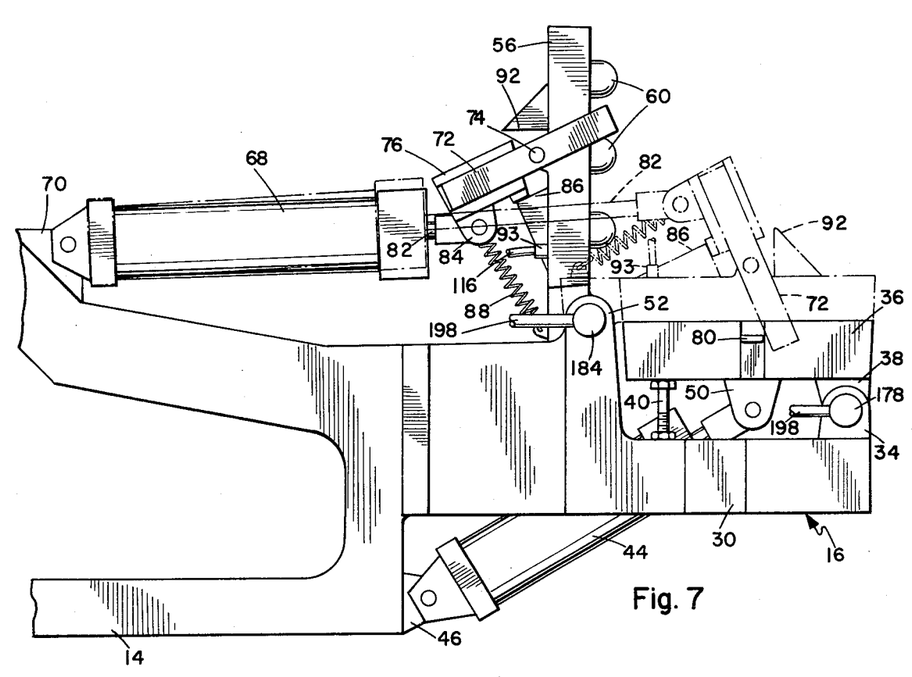
FIG. 7 is a side elevation view showing the opening action of the upper mold.
Figure 8:
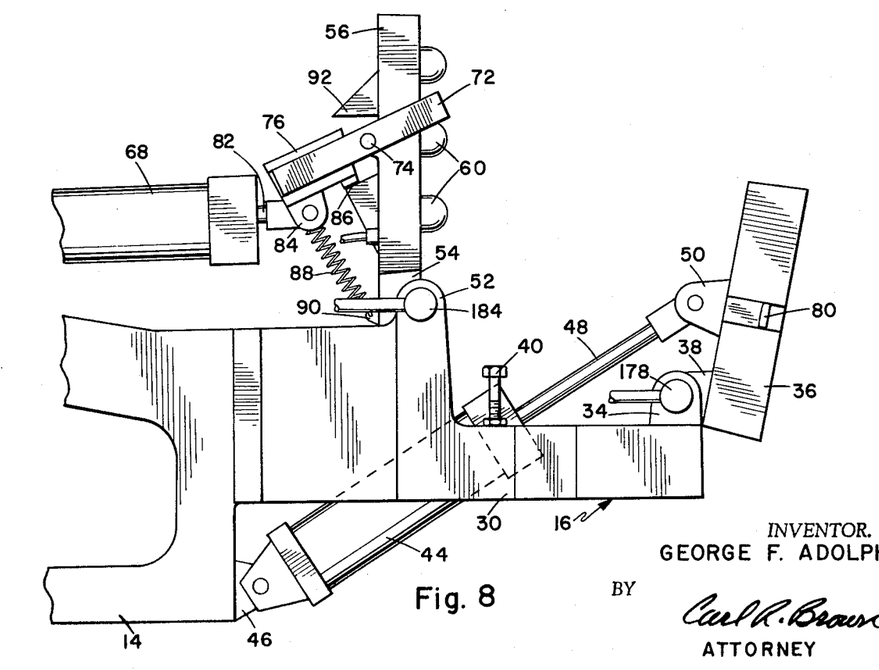
FIG. 8 is a side elevation view showing the ejection action of the lower mold.
Figure 9:
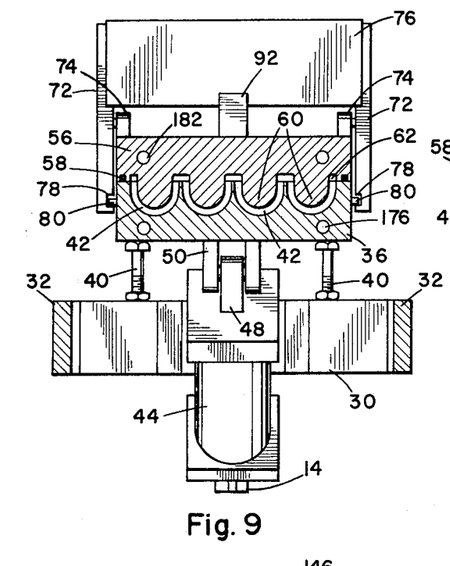
FIG. 9 is a sectional view taken on line 9—9 of FIG. 6.

Inwardly of the lower mold, the frame 30 has upwardly extending hinge brackets 52, between which the inner end portion 54 of upper mold 56 is pivotally held. In closed position the upper mold 56 rests flat on top of lower mold 36 and is sealed by a sealing ring 58 inset in the lower surface of the upper mold. The upper mold has plug-like cores 60 which project downwardly into cavities 42, the lower face of the upper mold being recessed around the cores to provide a continuous air pocket 62 interconnecting all of the cavities. A typical molded egg unit 64 is shown in FIG. 2, and has a generally semi-spherical depression 66, formed by a core 60, to receive a filling of suitable food product. The upper mold is hinged to swing upwardly and inwardly to a substantially vertical position and is operated by an actuator 68 pivotally attached to a lug 70 on frame 30. To hold the mold tightly closed, a pair of locking bars 72 are pivotally mounted on hinges 74 opposite sides of upper mold 56 and are joined at their upper ends by a connecting bar 76. The locking bars 72 extend downwardly on opposite sides of lower mold 36 and have notches 78 which engage locking lugs 80 projecting from the lower mold, as in FIG. 9. The piston rod 82 of actuator 68 is connected to a fork 84 on the rear of connecting bar 76. From the locked position shown in FIG. 6, the initial retracting action of actuator 68 swings the locking bars 72 clear of the locking lugs 80, as in the broken line position in FIG. 7. Pivoting action of the locking bars is limited by engagement of the connecting bar 76 with an inner stop 86 fixed on the top of upper mold 56. Further retraction of piston rod 82 thus pulls the upper mold up to the open position, as shown in full line in FIG. 7. A spring 88 connected between connecting bar 76 and a lug 90 on upper mold 56, holds the locking bars in their unlocked position when the upper mold is closed, returning to the broken line position in FIG. 7. Further extension of piston rod 82 then swings the locking bars 72 to engage locking lugs 80, until the connecting bar 76 engages a closure stop 92 on top of the upper mold, as in FIG. 6, securely clamping the mold elements together.

Figures 3, 4:
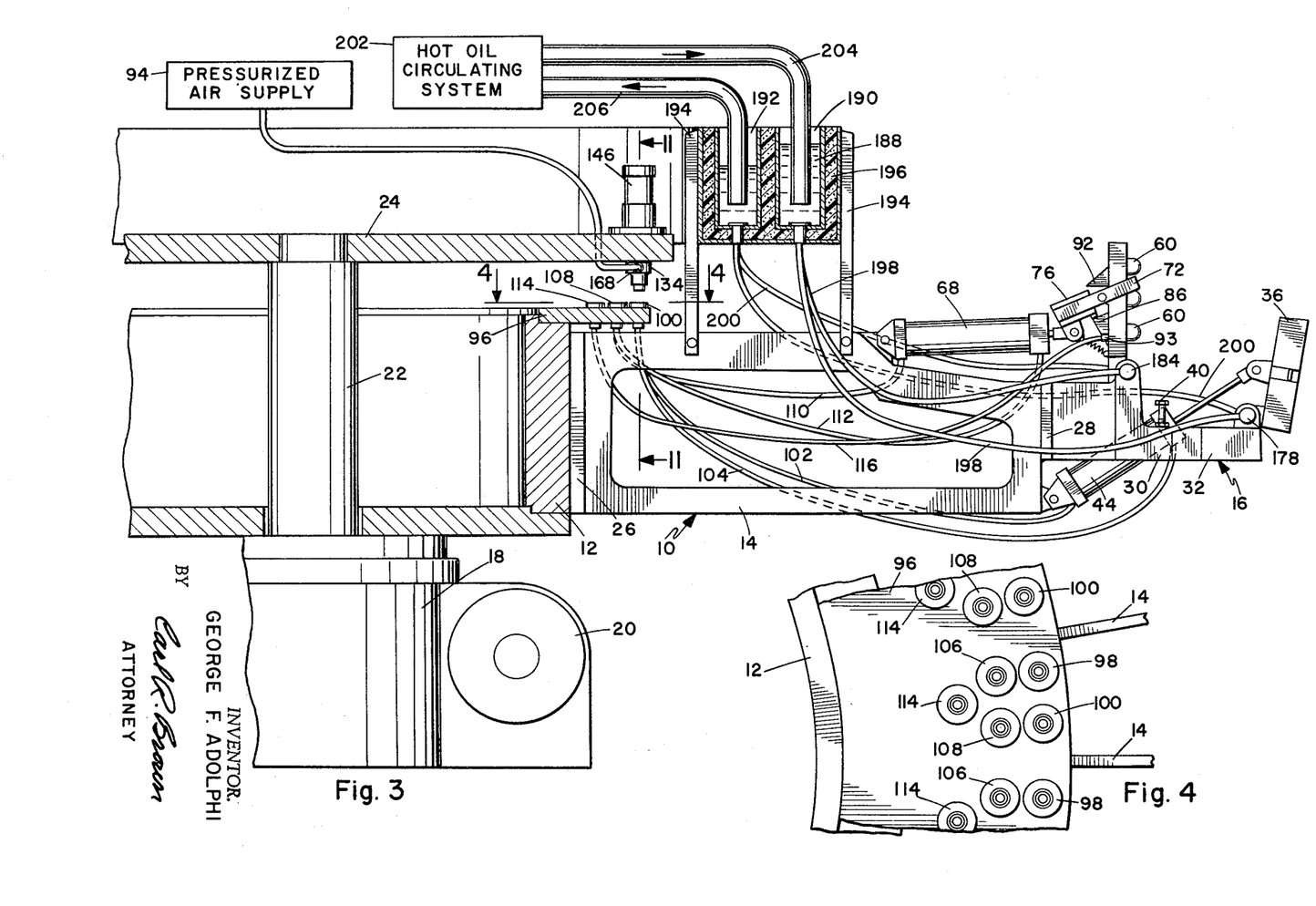
FIG. 3 is an enlarged sectional view taken on line 3—3 of FIG. 1.
FIG. 4 is an enlarged sectional view taken on line 4—4 of FIG. 3.
Figure 5:
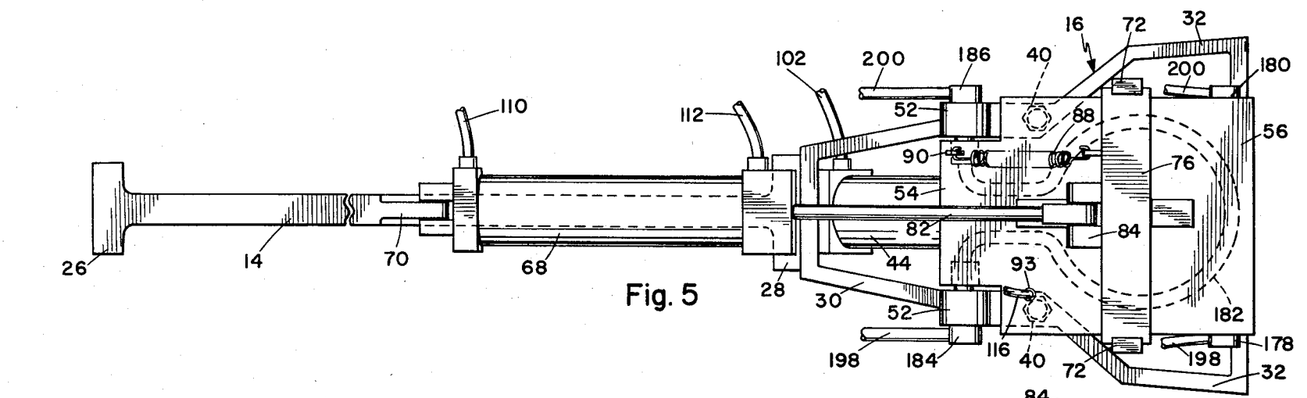
FIG. 5 is an enlarged top plan view of a single arm and mold assembly of the machine.

In the cooking process, described hereinafter, the mold interior is pressurized by compressed air in the air pocket 62, applied through an inlet 93 in upper mold 56. A conventional source of compressed air, indicated at 94 in FIG. 3, provides the pressurization and the power for actuators 44 and 68, the actions being selectively controlled at certain indexed stations. Hub 12 has a ring member 96 fixed thereon, on which are mounted the receiving valves through which air is supplied for the various functions. In the arrangement shown there are five valves at each arm position, as in FIG. 4. The outermost pair of valves 98 and 100 are coupled by hoses 102 and 104, respectively, to opposite ends of the lower mold actuator 44. Another pair of valves 106 and 108, positioned inwardly, are coupled by hoses 110 and 112 to opposite ends of the upper mold actuator 68. The single valve 114 at the innermost position of the group is connected by a hose 116 to the pressurization inlet 93.

Figure 11:
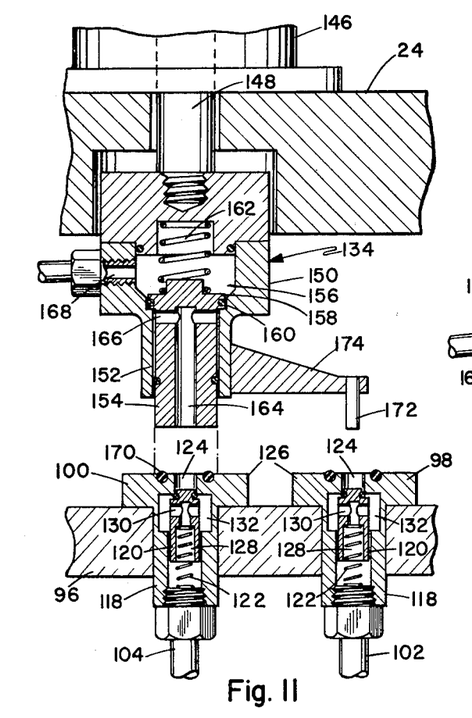
FIG. 11 is an enlarged sectional view taken on line 11—11 of FIG. 3.

The five receiving valves are all similar and valve 98 will be described in detail as shown in FIG. 11. The valve has a hollow body 118 in which is a slidable valve element 120, biased upwardly by a spring 122 to seat in and close a port 124 in the enlarged upper end 126 of the body, which rests on top of ring member 96. Valve element 120 has an axial air channel 128 vented to the sides through openings 130 in the upper portion of the element, which is contained in an enlarged chamber 132. When the valve element is forced down, air can enter port 124 into chamber 132 and pass through openings 130 and channel 128 to hose 102, which is connected to the lower end of body 118.

In the fixed platform 24 are mounted supply valves coupled to air supply 94, to provide compressed air to the appropriate receiving valve at the proper time. In FIG. 1 the supply valves are shown in their relation to the indexed stations and the grouped receiving valves at those stations. For reference purposes the stations of importance are numbered, with the product ejection station being considered last, or Station 36. At Station 1, the lower mold is retracted by operation of a supply valve 134 at the position of valve 100, and remains so, with the upper mold open, through Station 5. The operations at those stations will be described in the complete process. At Station 6, the upper mold is closed by operation of supply valve 136 at the receiving valve 106 and at Station 7 the mold is pressurized by operation of supply valve 138 over receiving valve 114. This condition is sustained until Station 34, where pressure is relieved by a pressure relief actuator 140 over valve 114. At Station 35, the upper mold is lifted by operation of supply valve 142 at receiving valve 108. Finally, at Station 36, a supply valve 144 at receiving valve 98 controls raising of the lower mold for ejection.

Figure 12:
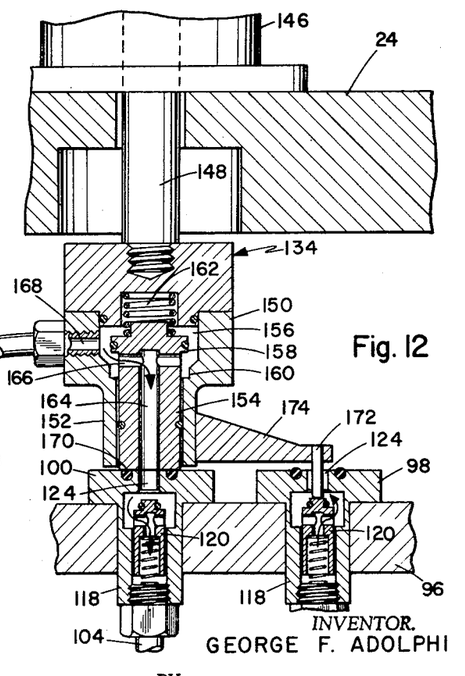
FIG. 12 is a similar sectional view showing the action of the air valve mechanism.

The five supply valves are all similar to the valve 134, shown in detail in FIGS. 11 and 12. The supply valve is actuated by a solenoid 146 with a vertically movable plunger 148 on which the valve body 150 is mounted. At the lower end of body 150 is a downwardly extending sleeve 152, in which is a slidable valve element 154, the lower end of the valve element projecting below the sleeve. The upper end of valve element 154 is disposed in an enlarged chamber 156, and has an annular flange 158 which is held down in a seat 160 by a spring 162. Valve element 154 has an axial air channel 164 with side opening passages 166 just below flange 158. The passages are normally sealed in sleeve 152, as in FIG. 11, to prevent leakage of air from the supply inlet 168 in chamber 156. When the solenoid 146 is operated to drive plunger 148 downwardly, valve element 154 is forced against the top of receiving valve 100, which has an O-ring 170 inset therein to seal the coupling. Continued downward motion of body 150 causes the valve element to be raised into chamber 156, as in FIG. 12, allowing supply air to pass through passages 166 and channel 164. The air pressure overcomes spring 122 and forces valve element 120 down to provide air to the associated actuator.

In the case of actuators 44 and 68, which are double ended, one receiving valve of the associated pair must be opened to relieve pressure when the other is pressurized. This can be accomplished by a relief pin 172 mounted on a bracket 174, which is fixed to sleeve 152. As in FIG. 12, when valve 100 is receiving pressure, the relief pin 172 enters port 124 of valve 98 and depresses the valve element to release pressure.

Receiving valve 114 is pressurized by a supply valve similar to valve 134, but without the pin 172. At Station 34, the relief actuator 140 is merely a solenoid with a plunger carrying a pin, not shown, which is comparable to pin 172 and depresses the valve element, thus releasing pressure from the mold. Each time the rotating assembly pauses at an indexed station, all the solenoids actuate together, since all the operations occur substantially simultaneously at the different stations. Various arrangements of timing means are well known and any suitable system may be used.

For closely controlled cooking the molds are heated by oil. The lower mold 36 has an internal duct 176, shown as substantially circular and having an inlet connection 178 and an outlet connection 180 on opposite sides of hinge brackets 34. The duct may be of any convenient configuration to ensure adequate heating. Connections 178 and 180 are incorporated into the hinge elements of the lower mold and provide convenient means for circulating oil without obstructing the motion of the mold. Upper mold 56 has a similar internal duct 182, with an inlet connection 184 and an outlet connection 186 on opposite sides of hinge brackets 52.

Heating oil 188 is carried in an open topped circular supply reservoir 190 and a similar concentric return reservoir 192, which are mounted on supports 194 above the rotating assembly to rotate therewith. The reservoirs have suitable thermal insulation 196 to minimize heat loss. Each mold assembly is individually connected to the heating system by supply hoses 198 from the supply reservoir 190 to inlet connections 178 and 184, and return hoses 200 from outlet connections 180 and 186 back to the return reservoir 192, as in FIG. 3. Oil is circulated by a conventional heating and circulating system 202, with a main supply pipe 204 inserted into supply reservoir 190 and a main return pipe 206 inserted to return reservoir 192. The main pipes 204 and 206 are stationary and the circulating system may be mounted on platform 24 if convenient. Circulating the heating oil in this manner eliminates the need for elaborate rotating couplings to the molds, and the heat distribution is efficient since the point of entry of hot oil is constantly moving around the supply reservoir as the assembly rotates. There is no contact between the heating oil and the food product, so it is not essential to use expensive cooking oil for heating.

Figure 13:
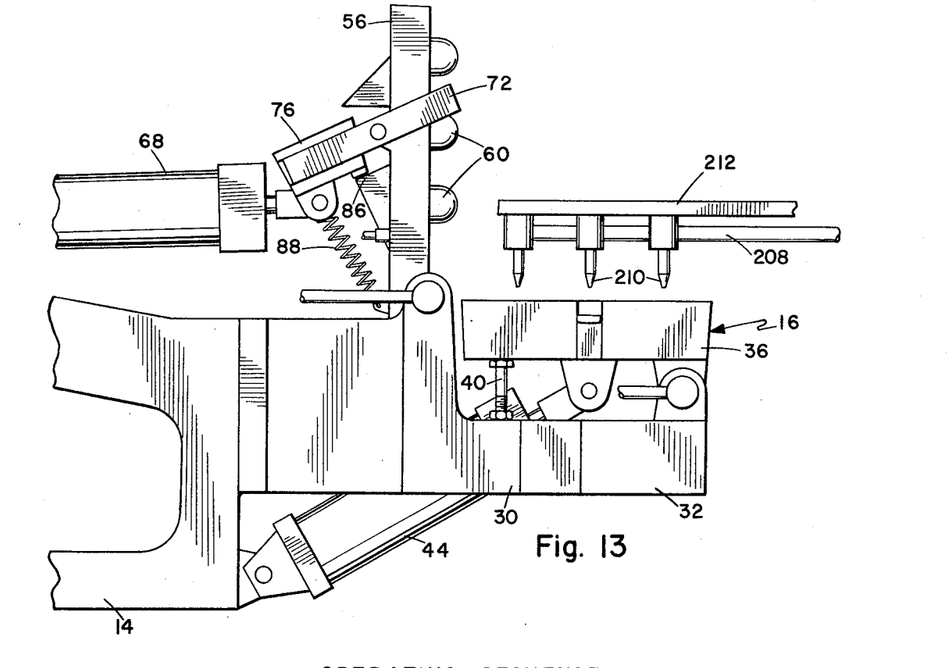
FIG. 13 is a side elevation view similar to FIG. 7, showing a dispensing manifold over the lower mold.

The molds are loaded in three steps at Stations 3, 4 and 5. Raw egg white has a tendency to adhere to almost any surface and, while the molds may be coated with Teflon, or the like, it is desirable in a continuous production operation to avoid the need for manually cleaning the mold. Thus at Station 3, a film of cooking oil is sprayed on the lower mold 36 from a spray manifold 208, preferably with individual nozzles 210 for each mold cavity, as in FIG. 13. A suitable support 212 holds the manifold securely in position just above the lower mold.

Figure 10:
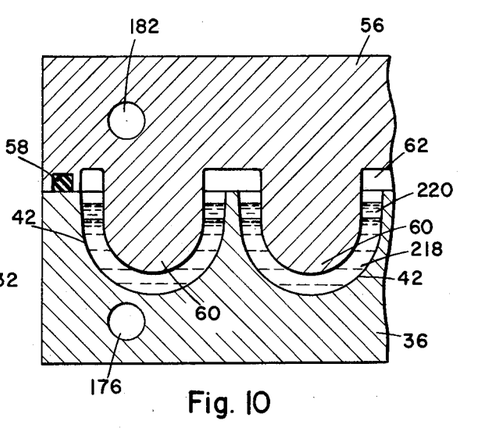
FIG. 10 is an enlarged portion of FIG. 9, showing the mold filled.

At Station 4, egg white is injected into the mold cavities from an injection manifold 214, which is similar to manifold 208 except for the nozzle tip configuration. Due to the high viscosity of raw egg white, it is preferable to have the supply homogenized by conventional means to ensure proper flow. At station 5 a manifold 216 applies a covering of cooking oil over the egg white. When the mold is closed, as in FIG. 10, and is pressurized, the egg white 218 and covering of cooking oil 220 tend to stratify and the air pressure that may be in the order of 20 psi holds the fluids in place, resulting in even, bubble free products that minimizes the bulging in the center of the upper surfaces. This stratifying is to an extent induced by the difference in specific gravities of the oil and the egg white, which stratification is aided by the application of the gas pressure. The cores 60 become coated with oil to prevent sticking as they pass through the layer of oil 220, when the mold is closed.

As indicated in FIG. 1, flow from the cooking oil supply 222 to manifolds 208 and 216 is controlled by valves 224 and 226, respectively. The flow of egg white from supply 228 to manifold 214 is similarly controlled by a valve 230. Metering valves of suitable type and their actuating means for dispensing measured quantities of substances, are well known in automatic food processing machinery.

Figure 14:
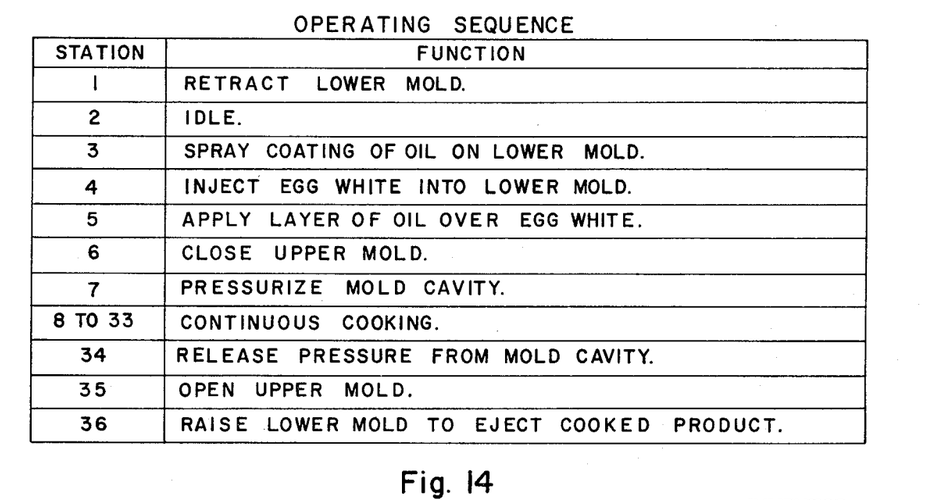
FIG. 14 is a tabulation of the steps of the process.

The complete sequence of operations is shown in FIG. 14, the numbered stations corresponding to those in FIG. 1. At Station 1, the lower mold is closed and Station 2 is an idle position, which allows for visual inspection of the mold when necessary. The mold is coated with oil at Station 3, egg white is injected at Station 4 and is covered with oil at Station 5, as described above. At Station 6, the upper mold is closed and locked, then the interior of the mold is pressurized at Station 7, completing the preparation of cooking. From Station 8 to Station 33, inclusive, the cooking is continuous, the mold remaining closed and pressurized. At Station 34 the air pressure is released from the mold interior and at Station 35 the upper mold is opened. The final action of the sequence, at Station 36, is to raise the lower mold and eject the cooked egg units. At the final station, suitable means would be provided to wash the egg units and prepare them for filling or for packaging as produced. Much of the cooking oil could be recovered from the washing operation, the techniques being well known.

It should be understood that, while the raw material described is egg white, the apparatus and process are applicable to other albumen type or similar substances, either natural or synthetic in origin. Also, the mold cavities are not limited to the egg shape shown, but could be of other configurations compatible with the molding process, such as for making novelty food products in distinctive shapes. Also it should be recognized that the speed of movement of the molds can be selectively varied, so that multiple steps can be accomplished at a single station and the number of molds can be varied.

Having described my invention, I now claim.

1. Apparatus for preparing cooked egg products comprising, at least one shaped product forming mold, means for applying a thin film of oil on the surface of the mold, means for depositing egg whites into said mold with a layer of oil on the upper surface of said egg white, means for sealing said mold and cooking said egg white, and means for applying gas under pressure to the upper surface of said layer of oil.

2. Apparatus for preparing cooked egg products, comprising, an assembly having at least one shaped product forming mold, indexing drive means connected to said assembly for advancing said mold to successive handling stations, said mold having hinged upper and lower portions, first actuating means at one station for opening said upper portion, injection means at a successive station for injecting raw egg substance into the mold, second actuating means at a successive station for closing said upper mold, heating means connected to said mold for maintaining heat through a number of indexed stations to cook the egg substances, and third actuating means at a final station, connecting to raise said hinged lower portion to eject the cooked product.

3. Apparatus according to claim 2 including, locking means on said upper portion actuated by said first actuating means to engage said lower portion and lock the mold in closed position.

4. Apparatus according to claim 2 wherein, said assembly having a plurality of arms, each carrying one of said molds, each of said molds having a fixed frame, said frame having outer hinge means and inner hinge means, said lower mold portion being pivotally mounted in said outer hinge means, to swing upwardly and outwardly from a closed position, and said upper mold portion being pivotally mounted in said inner hinge means to swing upwardly and inwardly from a closed position.

5. Apparatus according to claim 4 wherein, said first actuating means is a double acting actuator connected between said upper mold portion and said frame, said third actuating means is a double acting actuator connected between said lower mold portion and said frame, and control means at certain stations, with means for coupling to said actuators for selective opening and closing of the mold portions.

6. Apparatus according to claim 5 including, locking means on said upper mold, said locking means being operated by said first actuator to engage said lower mold portion and lock the mold portions together in closed position.

7. Apparatus according to claim 6 wherein, said locking means comprises a pair of interconnected locking bars pivotally mounted on opposite sides of said upper mold portion, said lower mold portion having protruding lugs thereon, said locking bars having slots to engage said lugs in locked position, and said first mentioned actuator being directly connected to said locking bars.

8. Apparatus according to claim 7 including, stop means on said upper mold portion limiting the travel of said locking bars between locked and unlocked positions.

9. Apparatus according to claim 8 including, spring means between said locking bars and said upper mold portion for biasing the locking bars to unlocked position.

10. Apparatus according to claim 5, wherein said actuators are fluid operated, said control means comprising a group of receiving valves mounted on said hub at each station and being connected to the fluid couplings of the actuators, a fixed support above said hub, supply valves mounted on said fixed support at selected locations for coupling with the appropriate receiving valves for performing the required actuator functions at certain stations, and means for coupling said supply valves momentarily with the related receiving valves.

11. Apparatus according to claim 4 wherein, said lower mold portion has a plurality of mold cavities therein, said upper mold portion having protruding cores fitting into said cavities in closed position, an air pocket in said upper mold portion interconnecting said cavities, an inlet to said air pocket, and a source of compressed air having control means for selective connection to said inlet.

12. Apparatus according to claim 11, wherein said last mentioned control means has one operating element at the station subsequent to the closing of said upper mold portion with the raw product in the mold, and another operating element at the station preceding opening of the upper mold after cooking the product.

13. Apparatus according to claim 4, wherein said heating means includes a hot oil reservoir mounted on said rotating assembly, hoses connecting said reservoir to each of said molds, and means for circulating hot oil through said hoses and molds.

14. Apparatus according to claim 4 wherein, said heating means includes an annular supply reservoir and a concentric return reservoir mounted on said rotating assembly and a source of circulating hot oil connected to said reservoirs, each of said mold portions having an inlet and an outlet and an internal oil duct therebetween, and supply hoses connected from said supply reservoir to said inlets and return hoses connected from said outlets to said return reservoir.

15. Apparatus according to claim 14 wherein, said inlets and outlets pass axially through the respective hinge means of the mold portions.

16. Apparatus according to claim 14 wherein, said reservoirs are open topped, said hot oil source having a fixed supply pipe immersed in said supply reservoir, and a fixed return pipe immersed in said return reservoir.

* * * * *